United States Patent [19]

Novoselsky

[11] Patent Number: 4,596,113
[45] Date of Patent: Jun. 24, 1986

[54] RAKE WITH PIVOTAL TINES

[76] Inventor: Boris Novoselsky, 66-01 110 St., Forest Hills, N.Y. 11375

[21] Appl. No.: 720,260

[22] Filed: Apr. 5, 1985

[51] Int. Cl.[4] .............................................. A01D 7/06
[52] U.S. Cl. .............................. 56/400.16; 56/400.04; 56/400.17; 172/378; 172/712; 172/657
[58] Field of Search .......... 56/400.01, 400.16, 400.17, 56/400.18, 400.21, 400.20, 426; 172/378, 712, 714, 657; D8/1, 13; 294/51, 52

[56] References Cited

U.S. PATENT DOCUMENTS

| 524,215 | 8/1894 | Quigley | 56/400.16 |
|---|---|---|---|
| 563,923 | 7/1896 | Guernsey | 56/400.21 |
| 966,602 | 8/1910 | Ross | 172/378 |
| 1,791,266 | 2/1931 | Erickson | 56/400.01 |
| 2,151,281 | 3/1939 | Stalkfleet | 56/400.01 |
| 2,479,877 | 8/1949 | Storm et al. | D8/13 |
| 3,193,999 | 7/1965 | Hester | 56/400.16 |
| 3,935,697 | 2/1976 | Hofer | 56/400.01 |
| 4,091,879 | 5/1978 | Lamberk et al. | 56/400.01 |

Primary Examiner—Gene Mancene
Assistant Examiner—John G. Weiss
Attorney, Agent, or Firm—Karl F. Ross; Herbert Dubno

[57] ABSTRACT

A rake having independently pivotal tines which have eccentric portions designed so that the rake moves through the soil on edge upon displacement of the support in one direction and moves through the ground broadside upon displacement of the rake through the ground in an opposite direction.

13 Claims, 7 Drawing Figures

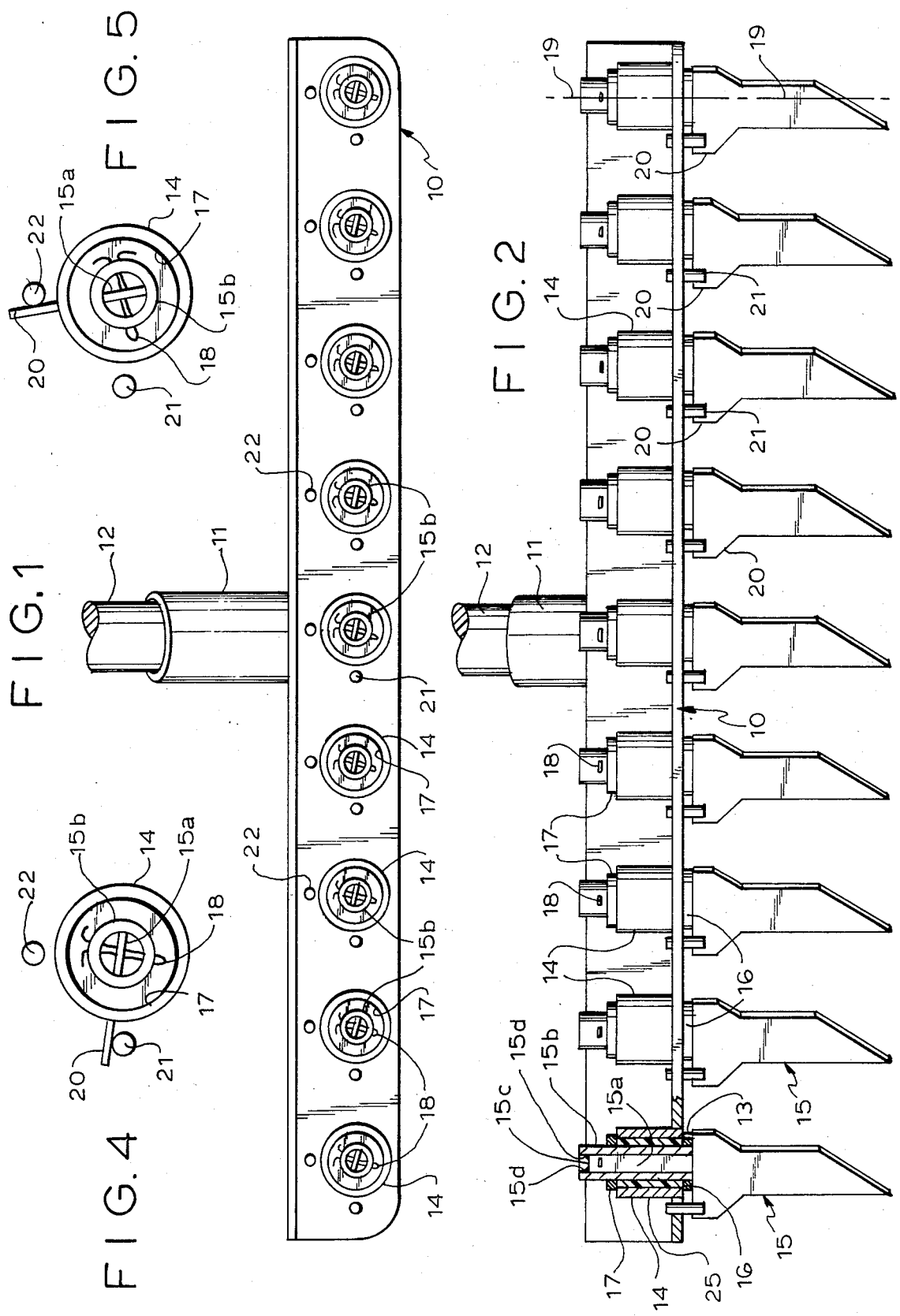

RAKE WITH PIVOTAL TINES

FIELD OF THE INVENTION

My present invention relates to a rake and, more particularly, an energy-conserving rake adapted to be drawn through the soil or used in other raking applications.

BACKGROUND OF THE INVENTION

A rake is a commonly used tool in agriculture, horticulture, soil preparation and ground maintenance, and for other purposes in which an array of tines are displaced in a combing action generally along the ground.

In a manual variation of such a rake, a handle may extend from a transverse member which is disposed substantially parallel to the ground and from which uniformly spaced tines may project downwardly into engagement with the soil.

While the configurations of such rakes may vary, it is the common practice to provide tines which are more or less fixed to a support although some deflection may be allowed in the form of a springiness of the tines.

That is not to say that prior art rakes do not exist with movable members. Indeed, there are rakes which have the capability of adjustment of the spacing between the tines and rakes which are provided with cleaning means designed to remove material which tends to accumulate between the tines or on the tines.

Notwithstanding the large number of rakes of different design and construction in general use, they all are more or less energetically inefficient and less versatile than desired.

OBJECTS OF THE INVENTION

It is the general object of my present invention to provide an improved rake.

A more specific object of this invention is to provide a rake which is more energetically efficient than rakes used heretofore.

Another object of the invention is to provide a rake kit which affords a high degree of versatility with respect to the raking functions which may apply.

SUMMARY OF THE INVENTION

These objects and others which will become more readily apparent hereinafter are attained, in accordance with the present invention in a rake having a transverse member adapted to be displaced substantially parallel to the ground and having a multiplicity of spaced apart tines projecting downwardly from this support, and means for pivotally mounting each tine about a respective axis transverse to the support and representing a longitudinal axis of the tine.

Advantageously, the tine is provided with a ground engaging portion which is eccentric with respect to the aforementioned axis so that when the rake is drawn in one direction along the ground, torsional force (torque) is applied to each tine tending to rotate it in one direction whereas when the rake is displaced in the opposite direction along the ground, the tines swing into a second position.

Stop means is provided on a support for immobilizing the tines in each of these limiting positions so that, when the tines are relatively broad, in one of these directions they may assume on-edge orientation with respect to the direction of displacement and thereby slice through the ground. In the other limiting position, however, they may present broad surfaces to the direction of displacement and thereby displace a large amount of material.

The alternation of groove cutting and displacement has been found to be energetically efficient because the major broadside displacement action which is the more energy consuming operation is effected more easily after the grooves have previously been formed by a slicing operation.

According to a feature of this invention, the tines are formed as flat blades having free pointed ends offset from the axis of the blades. The blades may have laterally projecting tabs which engage pins depending from the support and forming the stops.

I have found that this construction is highly effective in the pulverization and working of the ground.

According to another feature of this invention, a shank of each blade is welded within a tube and this tube is surrounded by a nylon sheath or other low friction bearing means and received within a cylindrical sleeve welded to an angle iron which is provided with bores aligned with these sleeves and through which the shanks are inserted.

Cotter pins or like removable means may be provided to hold the shanks in place, the blades being removable upon extraction of the cotter pins for blade replacement as need arises.

The rake of the invention may be supplied as a kit having blades of various widths so that selection of the blade set also constitutes a choice of interblade or intertine spacing.

The rake of the invention, moreover, is characterized by a self-cleaning effect which appears to result from the high velocity with which each blade or tine is swung from one position to another, the angular displacement resulting in a rapid cast off of materials which would normally be adherent to the blade or which might accumulate between the tines.

BRIEF DESCRIPTION OF THE DRAWING

The above and other objects, features and advantages of the present invention will become more readily apparent from the following description, reference being made to the accompanying drawing in which:

FIG. 1 is a plan view of a rake according to the invention;

FIG. 2 is a front view of the rake showing the tines in one position;

FIG. 4 is a top view of a tine in the position corresponding to FIG. 2 diagrammatically illustrating the engagement of a tab thereof with a stop;

FIG. 5 is a diagram similar to FIG. 4 showing the position of the tab when the tines are in their on-edge orientation (cf. FIG. 3);

SPECIFIC DESCRIPTION

Figure 3:
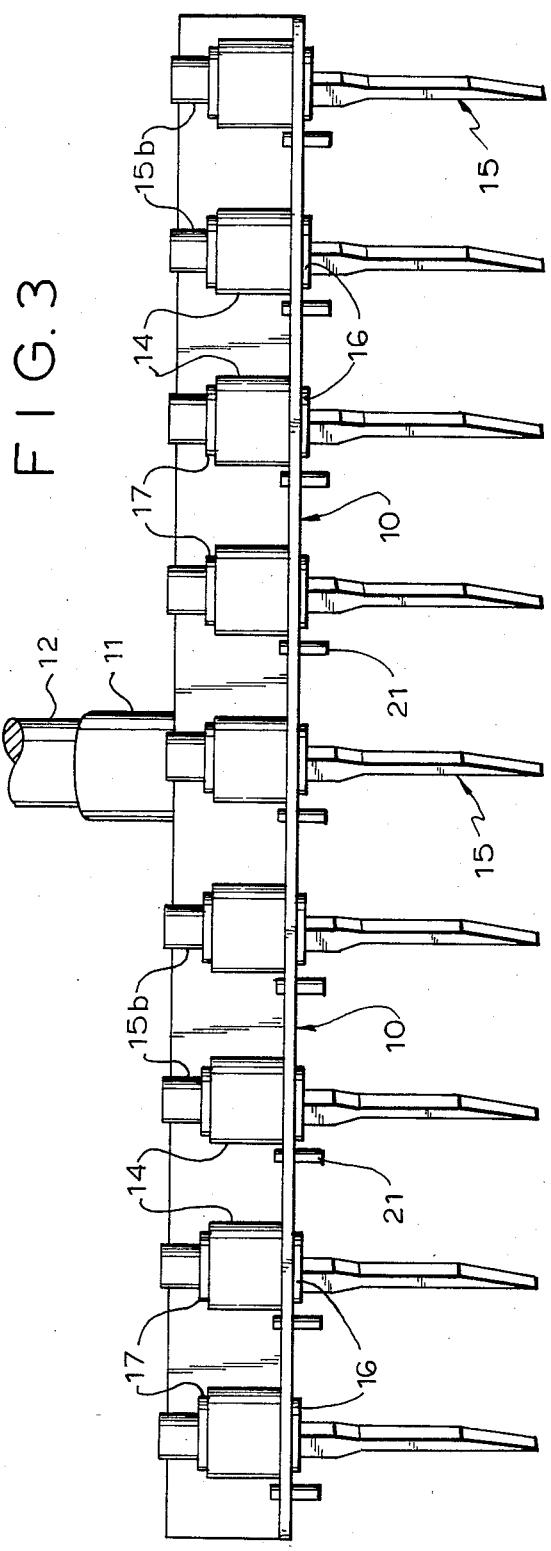
FIG. 3 is a front view of the rake showing the tines in their other alternate position.

The rake shown in FIGS. 1-6 comprises a support 10 which extends generally transversely to a handle socket 11 welded to this support and fitted with a handle 12.

The handle socket 11 is, more particularly, welded to one leg 10a of the angle iron forming the support 10 and whose other leg 10b is formed with a plurality of equispaced holes 13 each receiving a cylindrical sleeve 14 which extends upwardly from the leg 10b and is welded thereto.

A multiplicity of tines 15 are provided in equispaced relationship, each tine having a shank 15a which is received within a tubular shaft 15b to which the shank is screwed by welding at 15d. The shaft and the tine are provided with transverse holes 15c.

As is best seen from FIG. 2, a washer 16 and a washer 17 are disposed on axially opposite sides of the sleeve 14 and abut the tine 15 or a cotter pin 18 removably inserted into the passage 15c.

Figure 7:
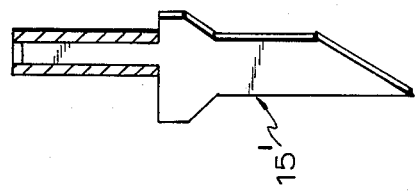
FIG. 7 is a view of a relatively narrow blade with its tubular shaft in section, which can be substituted for the wider blades of FIGS. 1-6 and which can form part of a kit with the latter rake, enabling a set of these blades to be substituted for the wider blades of these FIGS. to increase the intertine spacing.
Figure 6:
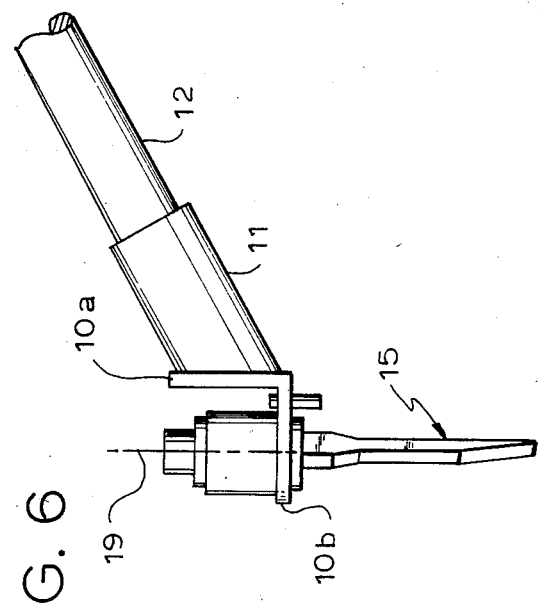
FIG. 6 is a side view of the rake with the tines in their broadside positions.

When the cotter pins are removed, each of the tine assemblies can be replaced, for example, by a tine assembly 15' (FIG. 7), a set of which is marketed as a kit with the rake so that by this substitution of tines, the spacing between the tines can be modified.

As FIGS. 1-6 show, each of the tines is rotatable about a respective longitudinal axis 19 and has a tab 20 which can engage either of two pins 21 or 22 fitted into respective bores of the leg 10b and welded in place.

Furthermore, each blade is eccentric at least in part to generate the torsion force or torque previously described. In the embodiment illustrated, the points 23 of the blades are offset from the axes 19, i.e. are eccentric.

Assume the rake is forced forwardly toward the viewer in FIG. 2, the force applied to the point 23 tends to swing this point in the direction opposite to the direction of displacement, i.e. rearwardly so that all of the tines swing into the on-edge position shown in FIG. 3 and the tabs 20 engage the pins 22. It is desirable that these pins be positioned so that the blades never lie exactly perpendicular to the support 10. This forward motion produces grooves in the soil so that, when the rake is next drawn toward the user, i.e. away from the viewer in FIG. 2, the points are again swung opposite the direction of displacement and the tines are brought into the broadside position of FIG. 2 in which the tabs 20 engage the pins 21 (see FIG. 4.)

It will be understood that the blades are readily replaceable in the event wear requires it, simply by removing the cotter pins; furthermore, the invention is not confined to a flat blade shape but may use tines bent to offset a point from an axis and further tines which are triangular, circular or oval in cross section.

Preferably a bearing is interposed between the sleeve 14 and the shaft 15b and, in the embodiment illustrated, this bearing is a nylon bushing 25 although a ball bearing can be used as well.

I claim:

1. A rake comprising:
   a support;
   at least one linear array of mutually spaced tines mounted on said support;
   respective means journaling each of said tines on said support for swingable displacement between two limiting positions relative to said support about a respective pivot axis transverse to said support and to the ground in an operating position of said rake; and
   respective stops on said support engageable with said tines in each of said positions whereby said tines are each swung into one of said positions by movement of said support and said tines along the ground in one direction and are swung into the other position upon movement of said support and said tines along the ground in an opposite direction.

2. The rake defined in claim 1 wherein each of said tines has a point engageable with the ground and offset from the respective axis.

3. The rake defined in claim 2 wherein each of said tines is formed with a shank remote from said point and a respective bearing surrounds each shank to pivotally mount the tine on said support.

4. The rake defined in claim 3 wherein said tine is a flat blade and said shank is integral therewith.

5. The rake defined in claim 4, further comprising a tubular shaft surrounding each shank and welded thereto.

6. The rake defined in claim 5 wherein said support is an angle member having two legs, said rake further comprising a handle socket welded to one of said legs.

7. The rake defined in claim 6 wherein the other of said legs is formed with a multiplicity of spaced apart sleeves each adapted to receive one of said tines, said sleeves being welded to the other of said legs.

8. The rake defined in claim 7 wherein said stops are pins fixed in said other leg.

9. The rake defined in claim 8 wherein a bearing is interposed between each tine and a respective sleeve.

10. The rake defined in claim 1 wherein said support is an angle member having two legs, said rake further comprising a handle socket welded to one of said legs.

11. The rake defined in claim 10 wherein the other of said legs is formed with a multiplicity of spaced apart sleeves each adapted to receive one of said tines, said sleeves being welded to the other of said legs.

12. The rake defined in claim 11 wherein said stops are pins fixed in said other leg.

13. The rake defined in claim 1, further comprising means for varying the spacing between said tines.

* * * * *